(12) United States Patent
Norton et al.

(10) Patent No.: US 8,857,821 B2
(45) Date of Patent: Oct. 14, 2014

(54) MANUAL ROBOTIC TOOL CHANGER WITH ROTATING PISTON

(75) Inventors: Daniel Allen Norton, Cary, NC (US); Kenneth L. Potts, Durham, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 1621 days.

(21) Appl. No.: 12/205,187

(22) Filed: Sep. 5, 2008

(65) Prior Publication Data

US 2010/0062919 A1  Mar. 11, 2010

(51) Int. Cl.
*B25J 15/04* (2006.01)
*B23B 31/103* (2006.01)

(52) U.S. Cl.
CPC ............... *B25J 15/04* (2013.01); *B23B 31/103* (2013.01); *Y10S 901/30* (2013.01)
USPC ............. 279/93; 279/141; 403/322.4; 901/30

(58) Field of Classification Search
USPC ............. 279/93, 94, 89, 104, 141; 403/322.4, 403/335, 349, 44, 338, 348; 901/30
See application file for complete search history.

(56) References Cited

U.S. PATENT DOCUMENTS

| | | | | |
|---|---|---|---|---|
| 783,925 | A | * | 2/1905 | Brake ........................... 137/292 |
| 3,079,178 | A | * | 2/1963 | Simpkins ........................ 285/83 |
| 3,759,536 | A | * | 9/1973 | Bronzini ......................... 279/89 |
| 4,875,275 | A | | 10/1989 | Hutchinson et al. |
| 4,990,022 | A | * | 2/1991 | Watanabe et al. ............. 403/349 |
| 5,018,901 | A | | 5/1991 | Ferree et al. |
| 5,118,254 | A | * | 6/1992 | Ellingson et al. .......... 415/213.1 |
| 5,211,501 | A | | 5/1993 | Nakamura et al. |
| 5,261,758 | A | | 11/1993 | Vranish |
| 5,284,366 | A | | 2/1994 | Herberman et al. |
| 5,488,215 | A | * | 1/1996 | Aronsson ................... 219/86.25 |
| 5,607,251 | A | * | 3/1997 | Rafn ............................. 403/348 |
| 6,073,512 | A | | 6/2000 | McCormick et al. |
| 6,540,188 | B2 | | 4/2003 | Jenkins et al. |
| 2002/0030328 | A1 | * | 3/2002 | Nock et al. ........................ 279/8 |
| 2007/0228670 | A1 | * | 10/2007 | Norton et al. ................ 279/2.11 |
| 2007/0228671 | A1 | * | 10/2007 | Norton ......................... 279/2.11 |
| 2008/0119339 | A1 | | 5/2008 | Oliver |
| 2010/0059943 | A1 | * | 3/2010 | Norton et al. ................... 279/72 |

FOREIGN PATENT DOCUMENTS

DE  10326239 A1  1/2005

* cited by examiner

*Primary Examiner* — Eric A Gates
*Assistant Examiner* — Paul M Janeski
(74) *Attorney, Agent, or Firm* — Coats & Bennett, PLLC

(57) ABSTRACT

A manually actuated robotic tool changer includes a first housing having a generally cylindrical piston with a central axis partially extending from the first housing, the piston rotatable about the axis. A plurality of tabs are disposed about the circumference of a portion of the piston extending from the first housing. A second housing has a bore to receive a portion of the piston. A plurality of locking lugs are disposed about the bore. The tool changer is manually actuated from an unlocked position wherein the piston assumes a position with respect to the first housing such that the extending portion of the piston may be moved within the bore with the tabs moving between the locking lugs, to a locked position wherein the piston is rotated with respect to the first housing such that the tabs move beneath the locking lugs to lock the first and second housings together.

12 Claims, 4 Drawing Sheets

MANUAL ROBOTIC TOOL CHANGER WITH ROTATING PISTON

FIELD OF THE INVENTION

The present invention relates generally to robotics, and in particular to a manually actuated robotic tool changer having a rotating piston.

BACKGROUND

Robots are widely utilized in industrial assembly line and other manufacturing applications to perform repetitive tasks very precisely without the need for human operation, interaction, or supervision. For example, robots are commonly used in the automotive industry to perform a number of tasks such as material handling, cutting, welding, and the like.

To amortize the considerable cost of an industrial robot over a variety of tasks, the robot arm is typically separate from a diverse array of robotic tools, which are removably attached to the end of the robot arm. To facilitate this plurality of tools, a tool changer—comprising "master" and "tool" devices—may be interposed between a robot arm and each tool that may be attached to it. The robot arm typically terminates in a master device. A corresponding tool device is connected to each tool that may be attached to the robot arm. A mechanical coupling mechanism in the tool changer positively locks the master and tool devices together for the duration of the use of the tool on the robot arm, and releases the tool from the robot arm upon completion of the tool's tasks. In a production manufacturing environment, robotic tool changers may be power actuated, such as by electric motor, pneumatic pressure, or the like, and software controlled. The robot arm control software then swaps out tools as necessary, reducing down time.

However, in many applications, such as where robotic tasks change only infrequently or where tools are changed only in the event of a tool failure or where there is no way to provide air or power for tool changer operation, a manually actuated tool changer may be simpler, more reliable, and less expensive than an automated one. A manual tool changer should be simple to operate, and should include safety features that prevent unintentional decoupling of the master and tool devices.

SUMMARY

One embodiment of the present invention relates to a manually actuated robotic tool changer. The tool changer includes a first housing adapted to be connected to one of a robotic arm or a robotic tool, and having a generally cylindrical piston having a central axis disposed therein and partially extending therefrom, the piston rotatable with respect to the first housing about the axis. A plurality of tabs are disposed about the circumference of a portion of the piston extending from the first housing. The tool changer also includes a second housing adapted to be connected to the other of a robotic arm or a robotic tool and having a bore sized and configured to receive a portion of the piston. A corresponding plurality of locking lugs are disposed about the circumference of the bore. The tool changer is manually actuated from an unlocked position wherein the piston assumes a position with respect to the first housing such that the extending portion of the piston may be moved within the bore with the tabs moving between the locking lugs, to a locked position wherein the piston is rotated with respect to the first housing such that the tabs move beneath the locking lugs to lock the first and second housings together.

Another embodiment of the present invention relates to a manually actuated robotic tool changer. The tool changer includes a housing and a piston having a central axis disposed in the housing. The piston is able to rotate at least partially about its axis and is further able to move axially with respect to the housing between a fully retracted position and a fully extended position. A spring member biases the piston to the retracted position. The piston is operative to mechanically engage another device of the tool changer upon being manually coupled thereto. The engagement moves the piston from the retracted position to a partially extended position, whereby a load connected to the other device of the tool changer is born by the spring member.

DETAILED DESCRIPTION

Figure 1:
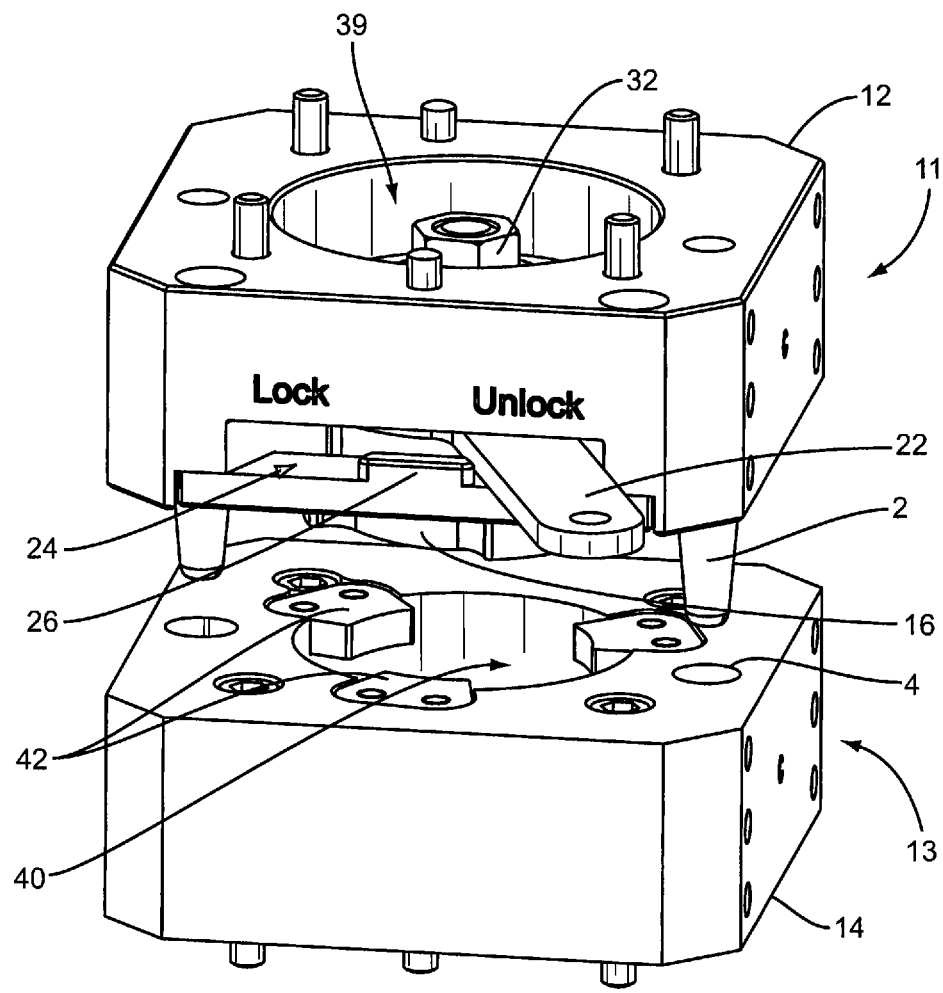
FIG. 1 is a perspective view of a manually actuated tool changer.

FIG. 1 depicts a manually actuated robotic tool changer 10. The manual tool changer 10 comprises a master device 11, adapted to be connected a robotic arm. A tool device 13 is adapted to be connected to a robotic tool, also known as an end effector. The manual tool changer 10 provides an effective mechanical coupling between the robotic arm and robotic tool. In the event of a tool failure, change of robotic task, or the like, the tool may be quickly and easily detached from the robotic arm, and another tool attached, by manual actuation of the tool changer 10. Note that reference to the master device 11 and tool device 13 are for convenience of explanation only. Those of skill in the art will readily recognize that an operative mechanical coupling is achieved if the master device 11 is connected to a robotic tool, and the tool device 13 is connected to the robotic arm.

The master device 11 comprises a housing 12, with a piston 16 disposed therein and partially extending therefrom. The piston 16 is generally cylindrical, meaning it has the general shape and aspect of a cylinder, although the piston 16 cross-section may resemble a rounded triangle, square, pentagon, hexagon, octagon, or the like. The piston 16 has a central axis, and is rotatable with respect to the master housing 12 about its axis. Connected to the piston 16, and extending through a slot 24 in the master housing 12, is a lever 22, which facilitates manual rotation of the piston 16.

The tool device 13 comprises a housing 14, having a central bore 40. The bore 40 is generally cylindrical, and is sized and positioned so as to receive the piston 16 when the master and tool devices 11, 13 are coupled together. Alignment members 2, shown disposed on the master device 11 in FIG. 1, mate with alignment member receiving voids 4 in the tool device housing 14, and serve to align the master device 11 and tool device 13 as they are mated together. Of course, the alignment members 2 may be located on the tool device 11 in other embodiments.

Figure 2:
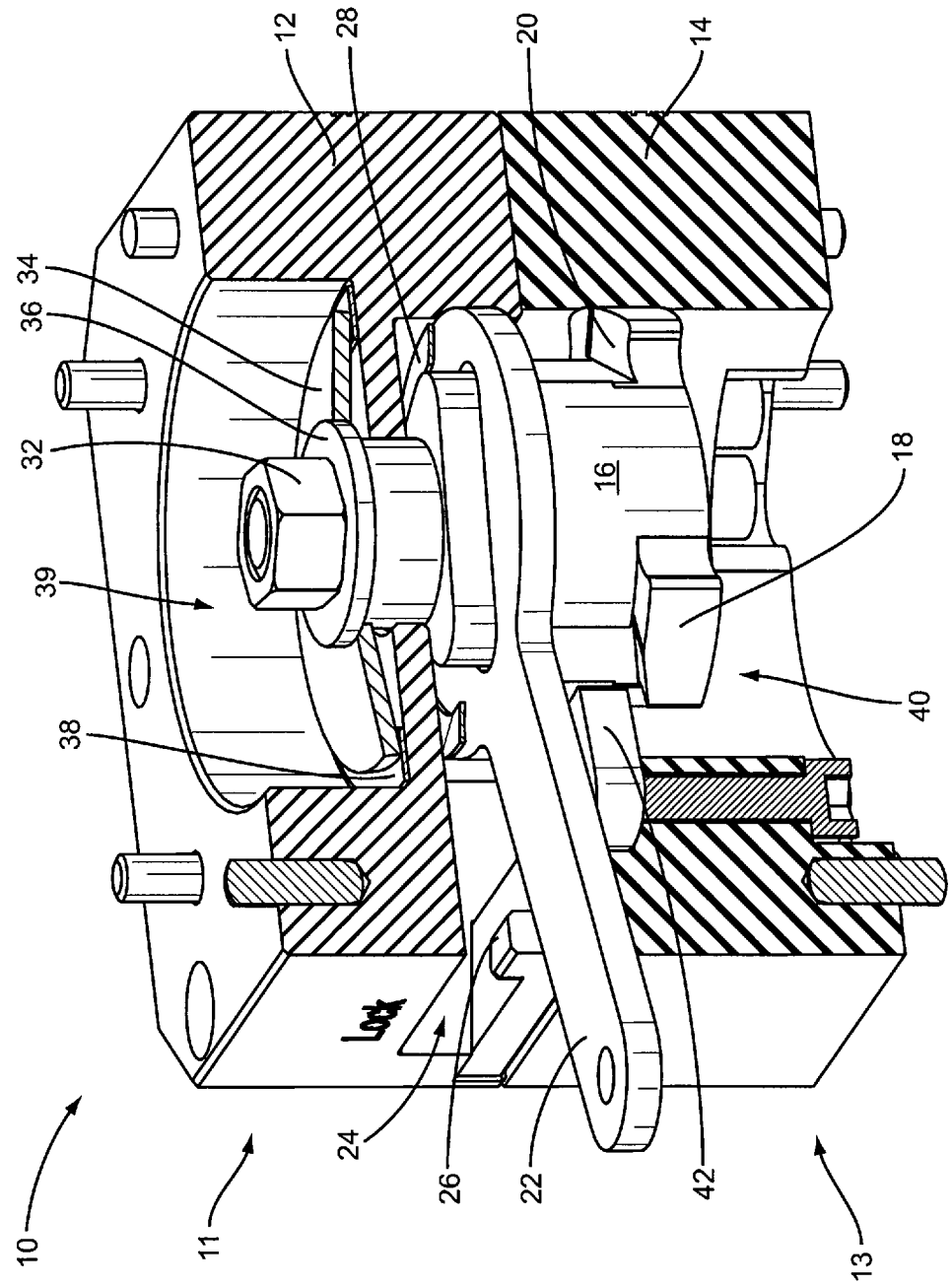
FIG. 2 is a cut-away perspective view of the manually actuated tool changer in a mated but unlocked position.

FIG. 2 depicts the master and tool devices 11, 13 abutted, with the piston 16 in the unlocked position, disposed within the bore 40. A plurality of tabs 18 are disposed about the circumference of the piston 16, on a portion of the piston 16 extending from the master housing 12 and into the bore 40. At least one tab 18, and preferably all tabs 18, include an angled cam surface 20 facing the master housing 12.

Disposed about the circumference of the bore 40 is a corresponding plurality of locking lugs 42. The locking lugs 42 are disposed about the circumference of the bore 40 such that, as the piston 16 (in the unlocked position) moves into the bore 40, the tabs 18 pass between the locking lugs 42.

Figure 3:
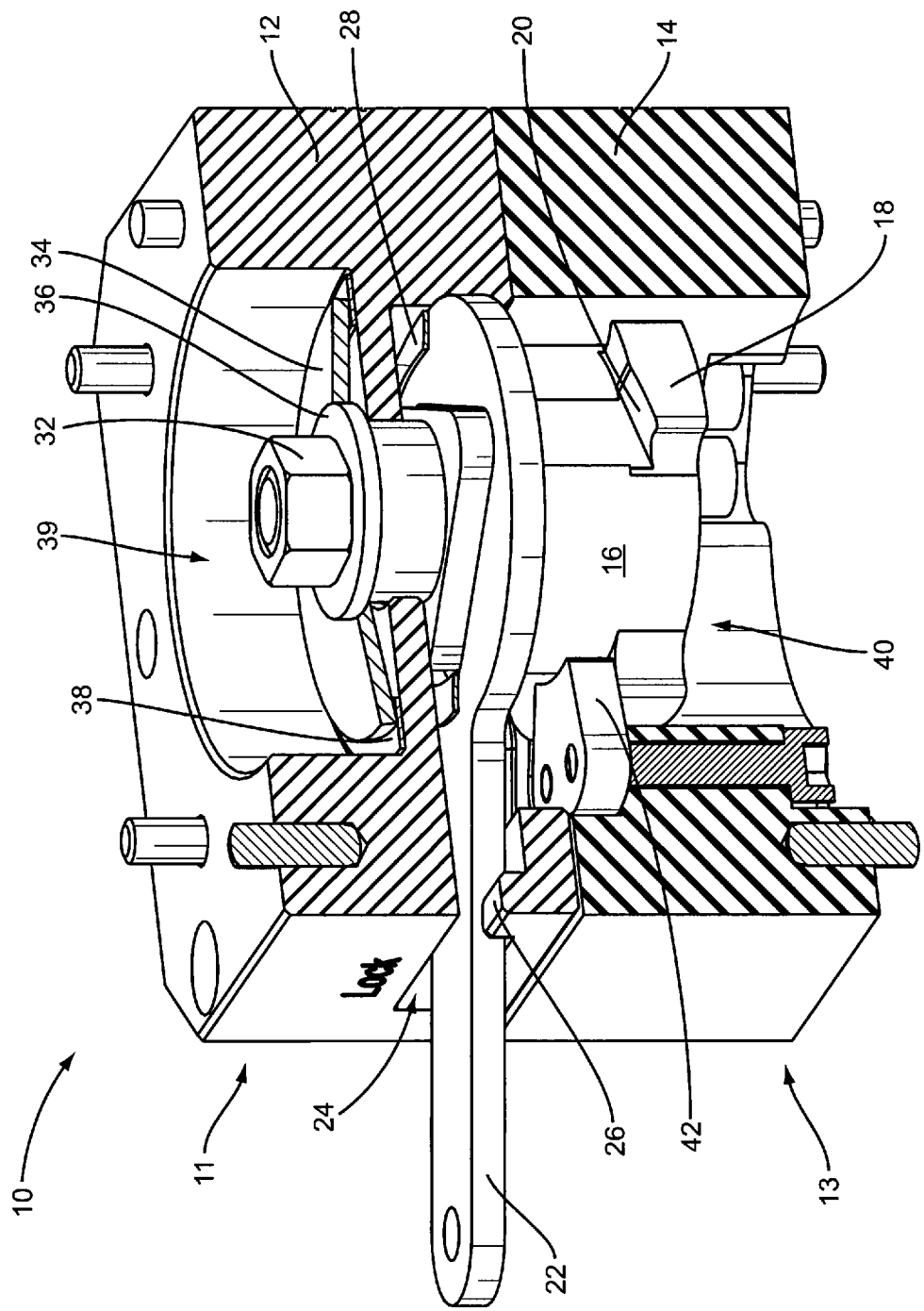
FIG. 3 is a cut-away perspective view of the manually actuated tool changer in a locked position.

FIG. 3 depicts the master and tool devices 11, 13 with the piston 16 having rotated with respect to the housing 12, in a clockwise direction as depicted in FIGS. 2 and 3, to a locked position. In the locked position, each tab 18 is beneath a corresponding locking lug 42, coupling the master and tool housings 12, 14 together. In particular, as the piston 16 is rotated from the unlocked to the locked position, the cam surface 20 of each tab 18 engages with a locking lug 42, and pulls the piston 16, and hence the master housing 12, to the tool housing 14. In the embodiment depicted, the lower surface of each locking lug 42 is flat—that is, perpendicular to the axis of the piston. In another embodiment, the lower surfaces of the locking lugs 42 may be angled or helical, to provide a greater surface area for contact with the cam surfaces 20 of the tabs 18.

Figure 4:
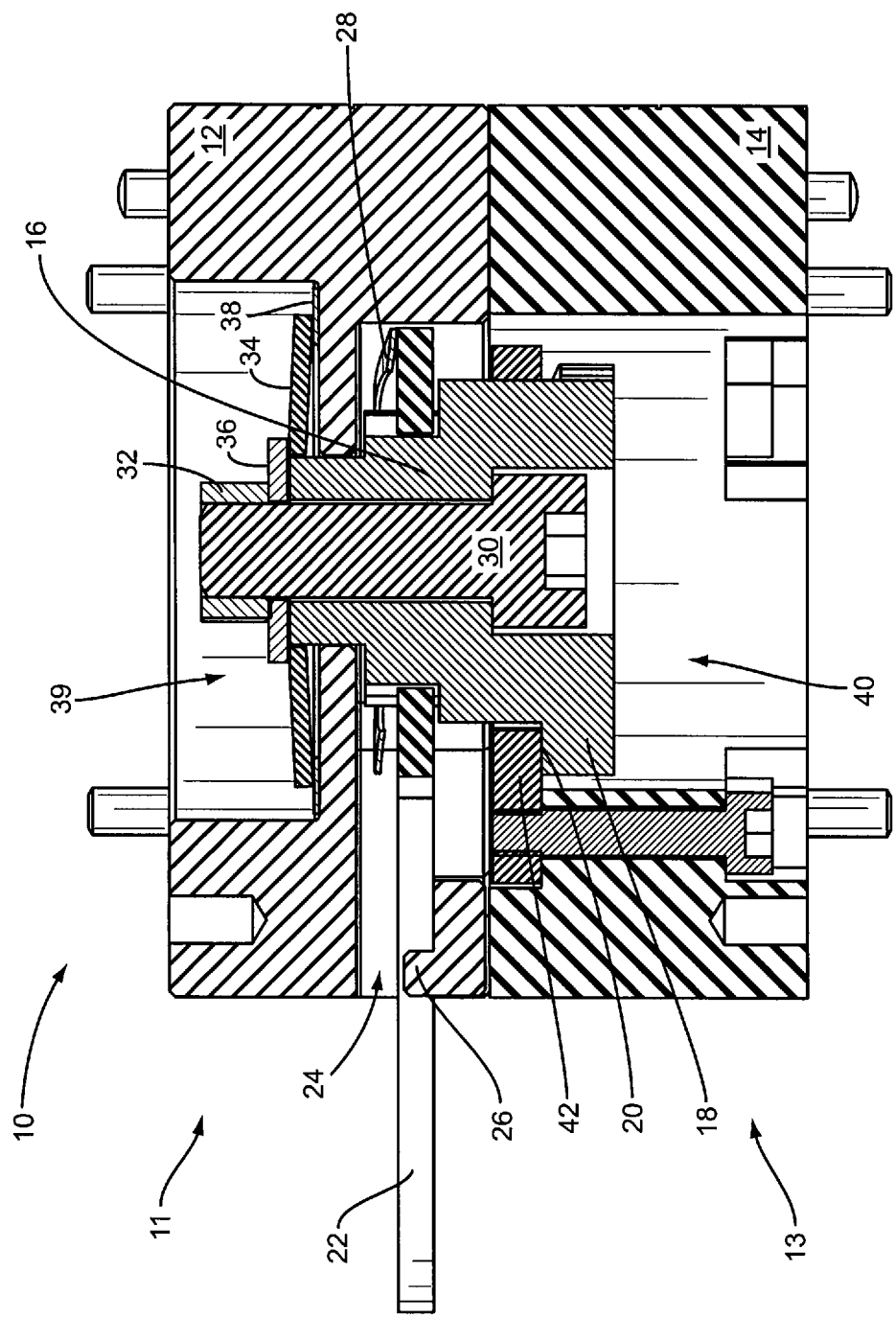
FIG. 4 is a section view of the manually actuated tool changer in a locked position.

FIG. 4 is a section view of the master and tool devices 11, 13 with the piston 16 in the locked position. The piston 16 is rotatably secured to the master housing 12 by a shoulder bolt 30 and nut 32. A spring member 34 in the form of a Belleville Washer biases the piston 16 in a direction away from the tool device 13, between a washer 36 and floor 38 of a chamber 39 formed in the back side of the master housing 12. The piston 16 is able to move slightly in the axial direction, towards the tool device 13, by deforming the spring member 34. The piston 16 is urged towards the tool device 13, against the bias of the spring member 34, by the action of the cam surfaces 20 on the tabs 18 engaging the locking lugs 42 as the piston 16 rotates from the unlocked to the locked position.

In one embodiment, and as best depicted in FIGS. 2 and 3, the cam surfaces 20 comprise a two-part surface on each tab 18. A first angled surface is operative to move the piston 16 in axial direction toward the tool device 13, against the bias of the spring member 34, as it engages a locking lug 42. A second, flat surface is operative to contact the locking surface 42, maintaining the piston 16 in a partially-displaced position in the axial direction, as depicted in FIG. 4. In one embodiment, the cam surfaces 20, and optionally the lower surfaces of the locking lugs 42, are helical, providing a greater surface area for their contact.

With the piston 16 partially displaced in an axial direction, the weight of the attached robotic tool is carried by the spring member 34. This allows the manual robotic coupler 10 to maintain a snug mechanical coupling, even as the mating surfaces of the tabs 18 and locking lugs 42 wear. It is also compensates for tolerance stack-up in a fit of individual parts within the locking mechanism, and prevents relative movement between the master housing 12 and tool housing 14.

Although the spring member 34 comprises a Belleville Washer in the master device 11 in the embodiment depicted, those of skill in the art will recognize that a spring member could advantageously be disposed in the tool device 13. For example, in one embodiment the piston 16, and hence the tabs 18, may be fixed against movement in the axial direction, with the locking lugs 42 able to move slightly toward the master device 11, against the bias of a spring member. A spring member may comprise any biasing mechanism known in the art, such as the deformation of a metal member, or member made from other flexible material to a degree less than its yield strength.

The piston 16 is rotated between unlocked and locked positions by manual actuation of a lever 22. In the embodiment depicted, the lever 22 is coupled to the piston 16, and extends outwardly of the master housing 12 through a slot 24 formed therein. As best depicted in FIG. 4, the slot 24 has a height greater than the thickness of the lever 22. In one embodiment, the slot 24 height is roughly twice the lever 22 thickness. The lever 22 is biased toward the lower surface of the slot 24 by a wave spring 28. A detent 26 arrests lateral movement of the lever 22, and hence rotation of the piston 16, from the locked position, thus preventing inadvertent decoupling of the manual robotic tool coupler 10. To decouple the coupler 10, the lever must be raised within the slot 24, against the bias of the wave spring 28, and simultaneously moved to the side, over the detent 26, to rotate the piston 16 to the unlocked position. A variety of other locking mechanisms may be employed. The lever 22 may be shaped or positioned in any manner, as required or desired for a given implementation.

Service transfer modules (not shown) may be attached to the master and tool housings 12, 14, such that the service transfer modules mate when the master and tool devices 11, 13 are coupled together, to provide for the transfer of utilities such as electricity, data signals, pneumatic fluid, and the like. Although not depicted in the drawings, the master and tool devices 11, 13 may alternatively or additionally include service transfer facilities within the housings 12, 14. For example, U.S. Pat. No. 5,211,501 to Nakamura, et al., incorporated herein by reference, depicts a robotic tool coupler having an integral pneumatic fluid transfer facility.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A manually actuated robotic tool changer, comprising
 a first housing adapted to be connected to one of a robotic arm or a robotic tool, and having a generally cylindrical piston having a central axis disposed therein and partially extending therefrom, the piston rotatable with respect to the first housing about the axis;
 a plurality of tabs disposed about the circumference of a portion of the piston extending from the first housing, at least one tab having an angled cam surface facing the first housing;
 a second housing adapted to be connected to the other of a robotic arm or a robotic tool and having a bore sized and configured to receive a portion of the piston;
 a corresponding plurality of locking lugs disposed about the circumference of the bore;
 wherein the tool changer is manually actuated from an unlocked position wherein the piston assumes a position with respect to the first housing such that the extending portion of the piston may be moved within the bore with the tabs moving between the locking lugs, to a locked position wherein the piston is rotated with respect to the first housing such that the tabs move beneath the locking lugs to lock the first and second housings together, and wherein as the the piston is rotated from the unlocked to the locked position, the cam surface of a tab engages a locking lug with increasing force, so as to pull the first and second housings together; and a spring member biasing the piston away from the second housing as the piston rotates between unlocked and locked positions.

2. The tool changer of claim 1 wherein the spring member is disposed in the first housing.

3. The tool changer of claim 2 wherein the piston is slightly movable relative to the first housing in an axial direction, and wherein the spring member biases the piston away from the second housing.

4. The tool changer of claim 3 wherein the spring member comprises a metallic member deformed below its yield strength by axial movement of the piston.

5. The tool changer of claim 4 wherein the spring member is a Belleville Washer.

6. The tool changer of claim 1 further comprising a lever connected to the piston to facilitate manual actuation of the piston between unlocked and locked positions.

7. The tool changer of claim 6 further comprising an arresting member operative to lock the lever in the locked position.

8. The tool changer of claim 7 wherein the lever extends from the piston through a slot in the first housing having a height greater than the thickness of the lever, and wherein the arresting member comprises a detent in the slot.

9. The tool changer of claim 8 further comprising a wave spring operative to bias the lever towards the surface of the slot on which the detent is disposed, so as to require lifting the lever over the detent against the bias of the wave spring to move the lever from the locked position.

10. The tool changer of claim 1 wherein one of the first or second housing includes one or more alignment members and wherein the other of the first or second housing includes corresponding alignment member receiving voids.

11. One device of a manually actuated robotic tool changer, comprising a housing;

a piston having a central axis disposed in the housing, the piston able to rotate at least partially about its axis and further able to move axially with respect to the housing between a fully retracted position and a fully extended position; and a spring member biasing the piston to the retracted position;

whereby the piston is operative to mechanically engage another device of the tool changer upon being manually coupled thereto, which engagement moves the piston from the retracted position to a partially extended position, whereby a load connected to the other device of the tool changer is born by the spring member.

12. The tool changer of claim 11 wherein the spring member comprises metal, and wherein movement of the piston to the partially extended position deforms the spring member to a degree less than its yield strength.

\* \* \* \* \*